3,730,832
NUCLEAR REACTOR FUEL CHARGING AND DISCHARGING SYSTEM

William N. Jackomis, Fairborn, Ohio, assignor to the United States of America as represented by the Secretary of the Air Force
Filed June 23, 1971, Ser. No. 155,741
Int. Cl. G21 19/20
U.S. Cl. 176—30                                          3 Claims

ABSTRACT OF THE DISCLOSURE

A nuclear reactor fuel charging and discharging system for colloid core reactors having fuel stored in containers in the shape of cyclone type separators. Valves positioned external to the reactor are opened to permit a gas flow through the containers to carry the nuclear fuel into the reactor cavity through a slot positioned near the periphery of the reactor cavity. A second set of valves positioned external to the reactor are opened, and the first valves are closed to remove the nuclear fuel from the reactor cavity. The nuclear fuel is separated from the gas which carries the fuel to the storage containers in the cyclone type separators.

BACKGROUND OF THE INVENTION

There are certain problems which arise in charging and discharging colloidal nuclear fuel in the cavity of a nuclear reactor system. A system for instantaneously charging the cavity is extremely important for accurate impulse control and for saving significant quantities of propellant gas during the reactor start-up period. Previously proposed methods of charging and discharging colloidal nuclear fuel in a reactor cavity have suggested mechanical means, such as opening and closing slots, vanes or other mechanical means within the reactor cavity. Such systems could be the source of major malfunction.

BRIEF SUMMARY OF THE INVENTION

According to this invention, slots are provided in the reactor cavity, which are permanently open. The slots are located near the periphery of the cavity and are shaped in such a manner that the gas flow within the cavity, under normal operating conditions, is not perturbed. The overall ducting system, which includes control valves, is located external to the reactor. The storage containers, which are inclosed with shielding material, are located in a non-nuclear environment.

IN THE DRAWINGS

DETAILED DESCRIPTION OF THE INVENTION

Figure 1:
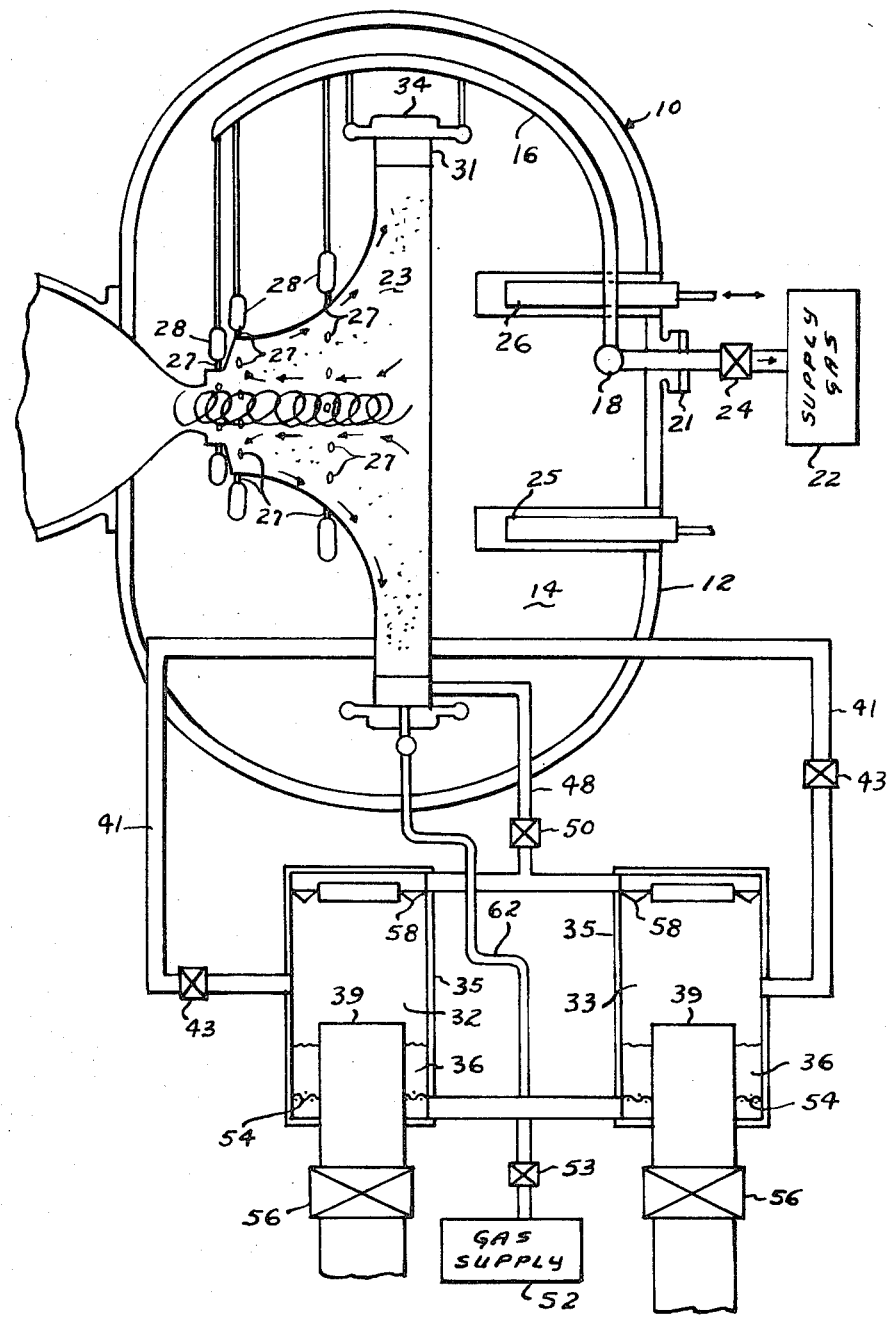
FIG. 1 is a partially cut away schematic view, illustrating an overall geometry for a reactor cavity using the reactor fuel charging and discharging system of the invention.

With reference to FIG. 1 of the drawing, reference number 10 indicates generally a dust core reactor provided with an outer semispherical pressure shell 12. The shell 12 encloses a moderator body 14. A conventional regenerative cooling passage is shown schematically at 16, connected to an inlet manifold 18, which is connected at 21 to a high pressure liquid hydrogen supply 22 through valve 24.

A reactor cavity 23 is provided within the moderator body 14. Conventional control means, such as control rods 25 and 26, provide control for the reactor. Gas is supplied to nozzles 27 connected to annular manifolds 28 and protects the forward wall of the cavity 23. Gas is also supplied to the cavity through vane structure 31 through manifold 34.

Figure 2:
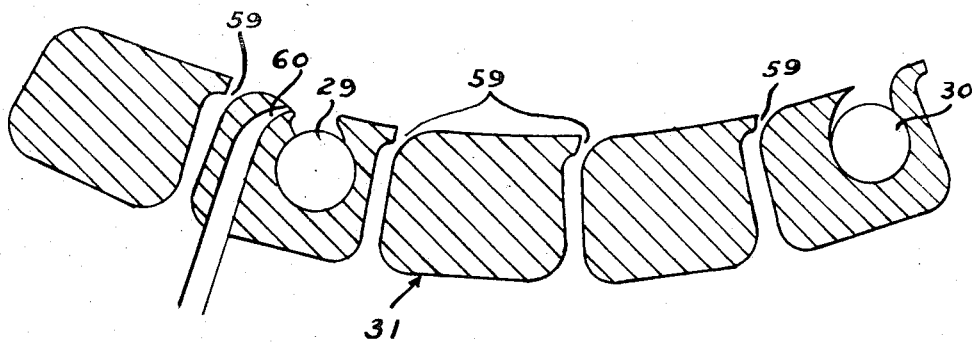
FIG. 2 is an enlarged schematic view of a portion of the inlet manifold taken along the line 2—2 of FIG. 1.

According to this invention, fuel is charged and discharged from the reactor cavity 23 by means of slot passages 29 and 30 in vane structure 31, as shown in FIG. 2. Fuel is stored in storage containers 32 and 33 which take the form of cyclone separators, such as shown in patents to Kamrath, 1,746,218, and Griffen, 2,506,298. The containers are enclosed with a conventional neutron absorbing material 35 such as tungsten. The nuclear dust particles are stored at 36 around the gas outlets 39. The nuclear dust particles are supplied to the cavity 23 through supply lines 41, control valves 43, and into slot 30, shown in FIG. 2. The nuclear dust particles are returned to the storage containers through slot 39 and return line 48 through control valve 50. The nuclear dust is carried into the cavity 23 by gas from supply 52, which passes through control valve 53 and porous walls 54, which may be porous membranes or fine screens. Control valves 56 are provided in gas outlets 39. Conventional swirl vanes 58 are provided in storage containers 32 and 33. Gas from cooling passage 16 is supplied to the cavity 23 in the conventional manner from nozzles 59 to provide a vortex flow within the cavity. So that slot 29 does not interfere with the main stream flow in cavity 23 during operation, an auxiliary slot 60 is provided adjacent slot 29 and gas from gas supply 52 is supplied to this slot through line 62.

In the operation of the device for reactor start-up, valve 24 is opened to introduce gas into cavity 23 through nozzles 27 and 59 to provide a vortex flow of gas within cavity 23. Valves 43 and 53 are then opened. The gas flowing through containers 32 and 33 carries the colloidal nuclear fuel into the reactor cavity through slot 30. The gas jet leaving slot 60 precludes interference with the main flow in cavity 23 by discharge slot 29.

When it is desired to discharge the colloidal fuel from the cavity 23 back into the containers 32 and 33, valves 43 and 53 are closed and valves 50 and 56 are opened. Thus, the jet from valve 60 is shut off and gas and nuclear dust pass out through slot 29 to the input of the cyclone separators. Vanes 58 provide a swirl motion to the gas and dust particles in containers 32 and 33, and the gas and nuclear dust is separated as in the patents to Kamrath and Griffen. When all of the colloidal nuclear fuel has been removed from cavity 23, valve 24 is closed to suht off the hydrogen gas flow.

There is thus provided a system for charging and discharging nuclear reactor fuel in a nuclear reactor system.

While two storage containers are shown, one could be used with sufficient neutron absorbing material provided around the storage containers such that the system does not approach the critical level with all of the fuel stored in one container.

I claim:

1. In combination with a colloid core nuclear reactor wherein a light gas is heated by diffusing it through a heavy fuel within an outer pressure shell enclosing a moderator body surrounding a central cavity forming a reactor chamber; means for providing a vortex flow within said chamber; said means for providing a vortex flow including means for providing a tangential flow of hydrogen gas within the chamber; an apparatus for charging said chamber with a critical mass of fine nuclear particles and for discharging the nuclear particles from the chamber, comprising: at least one nuclear particle storage container positioned away from the reactor chamber; a gas outlet duct extending into one end of said storage container; said storage container having a cylindrical wall spaced from said duct and forming therewith an annular particle storage section; a first conduit, connected between said storage container and said reactor chamber for supplying nuclear particles to the reactor chamber; a second conduit connected between the reactor chamber and the storage container for returning nuclear particles to the storage container; a gas supply means for providing a flow of gas from said gas supply through the particle storage section of the storage container and through the first conduit and into said reactor chamber for transporting nuclear particles from the storage container into the reactor chamber; means, in said second conduit and said gas outlet duct, for blocking the flow of gas therethrough during the nuclear particle charging operation for said nuclear reactor; means, in said first conduit and the gas input means, for blocking gas flow during the discharging operation for said nuclear reactor and means, in the storage container, for removing the nuclear particles from the gas flow to the gas outlet duct, and for depositing the nuclear particles in the particle storage section of the storage container.

2. The device as recited in claim 1, wherein the means for supplying a tangential flow of gas within the chamber includes vane structure having a plurality of circumferentially positioned nozzle slots; said vane structure including a first passage connected to the conduit for supplying nuclear particles to the reactor chamber and a second passage connected to the conduit for returning the nuclear particles to the storage container.

3. The device as recited in claim 2 including means for providing a flow of gas adjacent the second passage to preclude interference with the main flow in the reactor cavity by the second passage.

References Cited

UNITED STATES PATENTS

| | | | |
|---|---|---|---|
| 3,399,534 | 9/1968 | Hunter et al. | 60—203 |
| 3,574,057 | 4/1971 | Rom | 176—45 |
| 3,618,322 | 11/1971 | Von Ohain et al. | 176—39 X |

FOREIGN PATENTS

| | | | |
|---|---|---|---|
| 643,479 | 6/1962 | Canada | 176—45 |

CARL D. QUARFORTH, Primary Examiner

F. E. LEHMANN, Assistant Examiner

U.S. Cl. X.R.

176—39, 45; 60—203